No. 863,880. PATENTED AUG. 20, 1907.
J. B. RHODES.
DRAFT RIGGING FOR ELEVATING GRADERS.
APPLICATION FILED MAY 23, 1903.
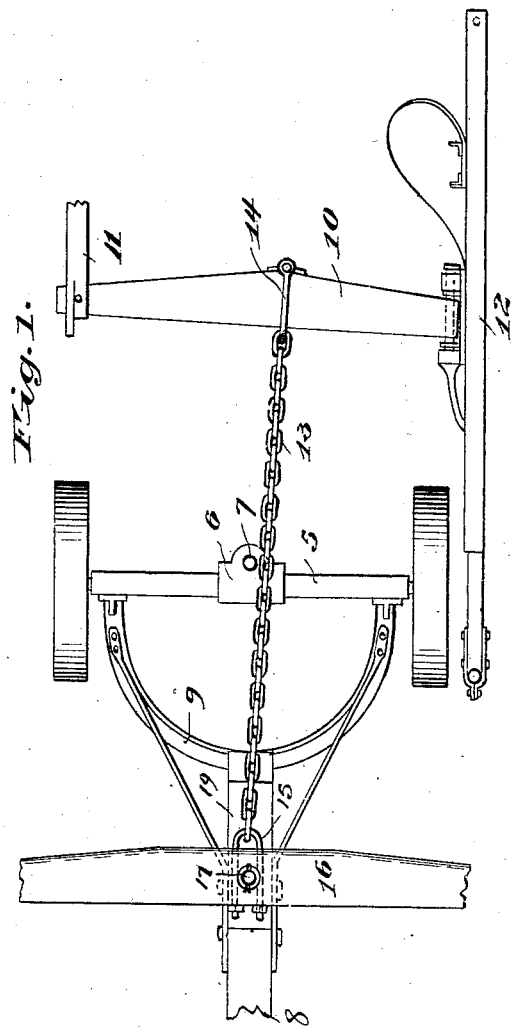
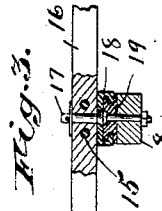
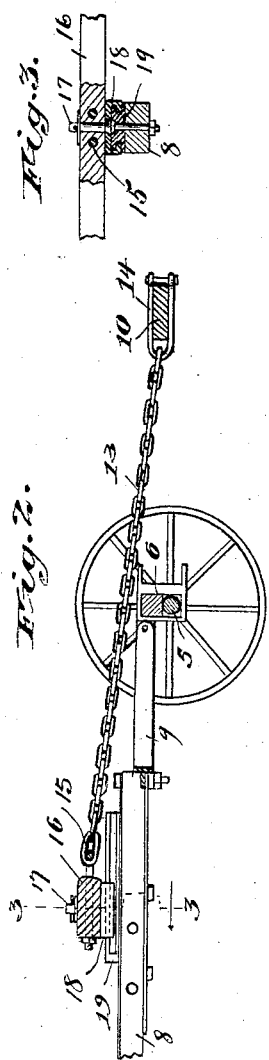
Witnesses,
F. B. Mann
S. N. Pond
Inventor,
Jay B. Rhodes,
By Offield, Towle & Linthicum
Attys.

UNITED STATES PATENT OFFICE.

JAY B. RHODES, OF HARVEY, ILLINOIS, ASSIGNOR TO F. C. AUSTIN MANUFACTURING COMPANY, OF CHICAGO, ILLINOIS, A CORPORATION OF ILLINOIS.

DRAFT-RIGGING FOR ELEVATING-GRADERS.

No. 863,880.      Specification of Letters Patent.      Patented Aug. 20, 1907.

Application filed May 23, 1903. Serial No. 158,452.

*To all whom it may concern:*

Be it known that I, JAY B. RHODES, a citizen of the United States, residing at Harvey, in the county of Cook and State of Illinois, have invented certain new and useful Improvements in Draft-Rigging for Elevating-Graders, of which the following is a specification.

The improvements hereinafter claimed relate more particularly to that class of earth-handling machinery known as elevating, grading and ditching machines in which there is employed as an essential feature a plow connected at one side of a wheeled frame or truck and with its beam arranged alongside the truck-frame. These plows are adjustably connected to the truck-frame by suspension-chains or cables and they are also further connected to the truck-frame by a draft-beam having a hinge connection at one end to the side of the frame opposite that on which the plow is placed, the other end of the draft-beam being connected to the side of the plow-beam. Heretofore this draft-beam has been connected to the truck-frame in several ways. In one form the draft-beam has been connected to the front axle or to the bolster mounted thereon so that the draft strain was upon said axle or its bolster. In another form of connection the draft rigging has been carried forward of the front axle and secured to the draft-pole or tongue whereby the bolster was or might be entirely relieved from the draft strain and the latter applied entirely to the draft-pole or tongue.

It is desirable in all heavy draft machinery of this class to make the draft connection as direct as possible, and in this machine the plow being the part of the apparatus producing the main draft it is desirable that the connection from the draft animals to the plow should be as simple and direct as possible. To accomplish this desired result I have shown in the accompanying drawing a simple form of draft rigging wherein the draft-beam of the plow is connected directly with the evener or double-tree to which the draft animals are hitched, and all the draft strains are therefore taken off the truck-frame axle, bolster and draft-tongue or pole.

It is further desirable to make the draft connection between the draft beam and the evener in such manner that a variable movement of the evener, or, in other words, its swinging movement around its axis, shall not be interfered with, and therefore this connection must be flexible and is preferably a pivotal connection.

In the accompanying drawing, Figure 1 is a plan view of so much of the truck of a machine of this character and its associated parts as is necessary to be shown in order to illustrate the invention; Fig. 2 is a side elevation of the same parts; and Fig. 3 is a cross-sectional view on the line 3—3 of Fig. 2.

In the drawing, let 5 represent the front axle and 6 the bolster of the wheeled truck carrying an elevating grading or ditching machine of the character above mentioned.

7 shows the apertures in the bolster for the king-bolt.

8 represents the draft-tongue connected in the usual manner by the hounds 9 to the axle.

10 is the draft-beam hinged to the side frame 11 of the wheeled truck at one end and connected at its other end to the plow-beam 12. This plow-beam will be adjustably connected with the wheeled truck in any well-known or desired manner.

The draft rigging comprises a chain or cable 13 connected by the clevis 14 to the draft-beam 10 at one end and its other end by the U-bolt 15 with the evener or double-tree 16. This evener is connected by a pivot-bolt 17 with a sliding casting 18 mounted to slide on suitable rods or guides 19 secured to the draft-pole or tongue 8.

With this simple apparatus the entire draft is sustained by the evener and the connection is direct from the evener to the draft-beam of the plow, the result being that all strains upon the intermediate parts tending to disrupt or displace them is obviated and a more simple and facile means is provided for affording the connections.

Since the plow is raised out of the ground when the truck is being turned it is not necessary to provide any means for taking up the slack in the draft-chain when the front axle is turned to an angular position, and the usual variations encountered in the operation of the machine do not result in deflecting the draft-pole or affecting the steering of the machine or changing the position of the axle. As shown in the drawing, the draft-chain passes over the top of the bolster and the draft rigging comprises a chain composed wholly of links, that is, being flexible throughout, but it is obvious that variations may be made in the character of the draft connection and in its precise relations to the other parts of the machine, the important feature being the direct connection from the evener to the draft-beam of the plow instead of through the intermediacy of the draft-pole, bolster, axle, or other fixed part of the wheeled frame or its accessories.

It will be understood that the connections between the plow and the truck frame are such that there may be a relative movement between the plow and the truck frame. Thus, when the plow strikes an unusual obstruction, its progress may be slightly arrested and when it overcomes such obstruction, or is not cutting, although in the down position, it may be drawn forward in advance of the forward movement of the truck. The sliding connection between the evener and the draft pole affords means whereby the power of the draft animals is applied, not only to move the machine as a whole over the ground, but also to draw the plow, and by the term "sliding evener" is meant such an arrangement as will permit relative movement of the evener with relation to the pole or to the machine as a whole. In machines of this character, the draft animals are frequently driven tandem, and in addition to the connection between the evener on the pole and the plow, the draft rigging may be extended forward beyond the pole to a lead team.

It will be observed that the flexible chain 13 affords a pivotal connection to the evener so that the evener may turn upon its pivot without interfering with the direct draft. Such pivotal connection might be made in other ways.

I claim:

1. In a draft rigging for earth-working machinery, the combination with an earth-working implement and its draft-beam, of a slidable evener or draft-bar, and a connection between said evener and draft-beam through which the power applied to the evener is directly transmitted to the draft-beam, substantially as described.

2. In an earth-working machine of the class described, the combination with a draft-pole, of a draft-bar or evener slidably mounted thereon, an earth-working implement and its draft-beam, and a connection between the sliding draft-bar or evener and said draft-beam whereby the power is transmitted directly from the former to the latter, substantially as described.

3. In an elevating grader, the combination with a wheeled frame or truck, of a plow adjustably connected to said frame, a draft-beam connected at one end to said frame and at its other end to the plow, a tongue or pole, an evener slidably mounted on said tongue or pole, and a draft-connection between said evener and said draft-beam, substantially as described.

4. In an elevating grader, the combination with a wheeled frame or truck, of a plow adjustably connected to said frame, a draft-beam pivotally connected at its ends to said frame and plow, respectively, a tongue or pole, an evener slidably mounted on said tongue or pole, and a draft-connection between and flexibly connected to said evener and said draft-beam, substantially as described.

JAY B. RHODES.

Witnesses:
SAMUEL N. POND,
FREDERICK C. GOODWIN.